(12) United States Patent
Renkel et al.

(10) Patent No.: US 10,066,134 B2
(45) Date of Patent: Sep. 4, 2018

(54) HYBRID MATRIX FOR FIBER COMPOSITE MATERIALS

(71) Applicant: HENKEL AG & CO. KGAA, Duesseldorf (DE)

(72) Inventors: Martin Renkel, Duesseldorf (DE); Emilie Barriau, Laguna Niguel, CA (US); Martin Hornung, Heidelberg (DE); Andreas Ferencz, Duesseldorf (DE); Konrad Becker, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 188 days.

(21) Appl. No.: 14/050,940

(22) Filed: Oct. 10, 2013

(65) Prior Publication Data
US 2014/0039118 A1    Feb. 6, 2014

Related U.S. Application Data
(63) Continuation of application No. PCT/EP2012/056313, filed on Apr. 5, 2012.

(30) Foreign Application Priority Data

Apr. 12, 2011  (DE) .......................... 10 2011 007 187
Apr. 21, 2011  (DE) .......................... 10 2011 007 896

(51) Int. Cl.
| | |
|---|---|
| B29C 43/12 | (2006.01) |
| B29C 43/20 | (2006.01) |
| B29C 45/16 | (2006.01) |
| B29C 70/44 | (2006.01) |
| B29C 70/46 | (2006.01) |
| B29C 70/48 | (2006.01) |
| C08J 5/04 | (2006.01) |
| C08J 5/24 | (2006.01) |
| C08G 18/40 | (2006.01) |
| C08G 59/40 | (2006.01) |
| C08K 7/14 | (2006.01) |
| C09J 5/06 | (2006.01) |
| C09J 163/00 | (2006.01) |

(Continued)

(52) U.S. Cl.
CPC ............ *C09J 163/00* (2013.01); *B29C 43/12* (2013.01); *B29C 43/203* (2013.01); *B29C 45/1671* (2013.01); *B29C 70/443* (2013.01); *B29C 70/46* (2013.01); *B29C 70/48* (2013.01); *C08G 18/4045* (2013.01); *C08G 59/4021* (2013.01); *C08J 5/043* (2013.01); *C08J 5/24* (2013.01); *C08K 7/14* (2013.01); *C09J 5/06* (2013.01); *C09J 175/04* (2013.01); *B29K 2105/06* (2013.01); *B29L 2031/3041* (2013.01); *C09J 2463/00* (2013.01); *C09J 2475/00* (2013.01); *Y10T 428/31511* (2015.04)

(58) Field of Classification Search
CPC .. C09J 163/00; C09J 2463/00; C09J 2475/00; C09J 5/06; C08J 5/06; C08J 5/24; C08J 5/043; C08K 7/14; C08G 18/4045; C08G 18/4021; C08G 59/4021; Y10T 428/31511; B29C 43/12; B29C 43/203; B29C 45/1671; B29C 70/443; B29C 70/48; B29C 70/46; B29L 2031/3041; B29K 2105/06
See application file for complete search history.

(56) References Cited

U.S. PATENT DOCUMENTS 3,647,616 A * 3/1972 Zemlin .................. A43B 23/17
                                                              12/146 D
3,898,090 A * 8/1975 Clark ...................... B22C 1/167
                                                              106/38.2

(Continued)

FOREIGN PATENT DOCUMENTS

EP        0337144        3/1989
EP        1469020        8/2002
(Continued)

OTHER PUBLICATIONS

International Search Report issued in connection with International Patent Application No. PCT/EP2012/056313 dated Aug. 21, 2012.

(Continued)

*Primary Examiner* — Patrick Dennis Niland
(74) *Attorney, Agent, or Firm* — Steven C. Bauman

(57) ABSTRACT

A fiber composite material obtainable by (a) mixing the components of a multi-component agent immediately before use, wherein component A of the multi-component agent contains at least one compound having two or more isocyanate groups, component B of the multi-component agent contains at least one compound which has at least two reactive groups selected from hydroxyl groups, thiol groups, primary amino groups and secondary amino groups and is simultaneously free from epoxy groups, and at least one of the components of the multi-component agent contains at least one epoxide prepolymer, (b) introducing the resulting application preparation into a mold in which fibers and optionally further additives are present, the resulting mixture containing at least one latent hardener for epoxide prepolymers, (c) pre-curing the resulting mixture at a temperature from 5° C. to 90° C., and (d) then finally curing the pre-cured fiber composite material at temperatures from 100° C. to 240° C., wherein the fiber composite material being removed from the mold after step (c) or step (d).

5 Claims, No Drawings

(51) Int. Cl.
*C09J 175/04* (2006.01)
*B29K 105/06* (2006.01)
*B29L 31/30* (2006.01)

(56) References Cited

U.S. PATENT DOCUMENTS

| | | | |
|---|---|---|---|
| 4,740,539 A | 4/1988 | Goel | |
| 4,755,341 A * | 7/1988 | Reavely | B29C 43/10 |
| | | | 264/102 |
| 7,241,502 B2 | 7/2007 | Anselmann et al. | |
| 8,455,090 B2 * | 6/2013 | Schmidt et al. | 428/297.4 |
| 2008/0105394 A1 * | 5/2008 | Kokko | D21F 11/14 |
| | | | 162/111 |
| 2009/0143510 A1 * | 6/2009 | Lin | C08G 61/08 |
| | | | 524/114 |
| 2010/0187715 A1 * | 7/2010 | Degen | C08G 59/4215 |
| | | | 264/176.1 |
| 2011/0111663 A1 * | 5/2011 | Kawamoto | C08G 59/5033 |
| | | | 442/175 |
| 2012/0040106 A1 * | 2/2012 | Simmerer | B29B 15/122 |
| | | | 427/560 |

FOREIGN PATENT DOCUMENTS

| | | |
|---|---|---|
| JP | 58-001726 A | 1/1983 |
| JP | 58-191723 A | 11/1983 |
| JP | 04-088011 A | 3/1992 |
| JP | 2005-060680 A | 3/2005 |
| JP | 2005-314536 A | 11/2005 |
| JP | 2006-104277 A | 4/2006 |
| JP | 2008-069474 A | 3/2008 |
| WO | 2004111136 | 12/2004 |
| WO | 2006053640 | 5/2006 |
| WO | 2007025007 | 3/2007 |
| WO | 2007064801 | 6/2007 |
| WO | WO 2009/157295 | * 12/2009 |
| WO | 2010108723 | 9/2010 |
| WO | 2010108846 | 9/2010 |

OTHER PUBLICATIONS

G. Carrot, et al."Atom Transfer Radical Polymerization of n-Butyl Acrylate from Silica Nanoparticles" J. Polym. Sci., Part A: Polymer Chemistry, vol. 39, 4294-4301 (2001).
DIN EN ISO 527-1/-2.

* cited by examiner

HYBRID MATRIX FOR FIBER COMPOSITE MATERIALS

FIELD OF THE INVENTION

The present invention relates to a fiber composite material having a resin system with two chemical curing mechanisms, to the corresponding pre-cured fiber composite material, the corresponding production methods and components containing said fiber composite materials.

BACKGROUND OF THE INVENTION

As mixed materials, fiber-reinforced composite materials generally consist of at least two components. In addition to a resin component, such as for instance an epoxide, cyanate or phenolic resin, the fiber-reinforced composite materials encompass a fiber component which can consist for example of unidirectional fibers but also of nonwoven fabrics, woven fibers or chopped fibers. In combination with the resin component that is used, the fiber component that is used imparts high strength to the material, for which reason fiber-reinforced composite materials are used as composite materials in application areas with stringent requirements in terms of structural material properties, such as in aircraft construction, automotive construction or in the production of rotor blades for wind turbines.

Epoxide resins or mixtures of various epoxide resins are used as the resin component for many of these applications.

While epoxide-based fiber-reinforced composite materials have a comparatively high modulus and a comparatively high glass transition temperature, they are, however, usually brittle.

Therefore a number of proposals exist in the prior art for improving the mechanical properties of epoxide-based fiber-reinforced composite materials, in particular in the interlaminar regions of the materials. For example, rubbers, thermoplastics or certain fillers are added, often in combination, to improve toughness.

Thus, for example, a method was proposed in WO-A1-2010/108846 to allow for epoxide curing in the presence of thermoplastic particles.

To date, however, the measures proposed in the prior art have not yet been able completely to satisfy all requirements.

In addition to the completely cured epoxide-based fiber composite materials, such as are obtained with vacuum infusion and vacuum injection techniques, prepreg systems also frequently find application in industry. Epoxide-based prepregs consist of fibers which are impregnated with an epoxide resin matrix that is not yet or is only partially cured. Curing of such systems takes place at temperatures above 100° C., only after processing of the prepregs. Such epoxide-based prepreg systems offer satisfactory mechanical properties but have the disadvantage that the curing mechanism is initiated at the fiber coating stage. To avoid a premature complete cure, such fiber composite materials thus have to be stored in very cool conditions (preferably at −20° C.). If the cooling chain for such prepregs is interrupted, they cure and become unusable.

SUMMARY OF INVENTION

The object of the present invention was accordingly firstly to further optimize the epoxide-based fiber composite materials, particularly with regard to their mechanical properties. At the same time, the object of the present invention was to provide processable, not yet completely cured fiber composite materials that are capable of being stored under less exacting cooling conditions. The possibility of storage at temperatures around freezing point would already be a significant advance; in particular, however, storage without the need for cooling is particularly desirable.

As part of the work in support of the present invention, it was surprisingly found that the mechanical properties of epoxide-based fiber composite materials can be improved if they have a polymer network, preferably a polyurethane network, that is formed in situ. It was further found that the resulting hybrid system having two mutually separate curing mechanisms gives rise to many novel possibilities. Thus, for example, pre-cured fiber composite materials (with isocyanate curing already completed) have interesting properties which were hitherto unable to be achieved with conventional epoxide-based fiber composite materials. These properties lead to novel application concepts for such systems.

The present invention thus firstly provides fiber composite materials that are obtainable by
(a) mixing the components of a multi-component agent immediately before use, wherein
   component A of the multi-component agent contains at least one compound having two or more isocyanate groups,
   component B of the multi-component agent contains at least one compound which has at least two reactive groups selected from hydroxyl groups, thiol groups, primary amino groups and secondary amino groups and is simultaneously free from epoxy groups, and
   at least one of the components of the multi-component agent contains at least one epoxide prepolymer,
(b) introducing the resulting application preparation into a mold in which fibers and optionally further additives are present, the resulting mixture containing at least one latent hardener for epoxide prepolymers,
(c) pre-curing the resulting mixture of application preparation and fibers at a temperature from 5° C. to 90° C., and
(d) then finally curing the pre-cured fiber composite material at temperatures from 100° C. to 240° C.,
wherein the fiber composite material being removed from the mold after step (c) or step (d).

DETAILED DESCRIPTION OF THE INVENTION

According to the invention a "fiber composite material" is a mixed material which consists of at least two main components and contains fibers as a reinforcing component and a resin matrix. A distinction must be made between the completely cured fiber composite material, where the resin matrix is completely cured, in other words that matrix is free from or contains only small amounts of reactive resins, and pre-cured fiber composite materials, where the matrix still contains at least one reactive epoxide resin.

According to the invention "reactive resins" are understood to mean firstly the epoxide prepolymers that are substantial to the invention and secondly the compounds having at least two or more isocyanate groups that are substantial to the invention.

Suitable fibers include in principle all fibers of natural and synthetic origin that offer high strength and high ultimate elongation. The fibers are preferably selected from carbon fibers, aramid fibers, glass fibers, silicon nitride fibers, metal fibers, ceramic fibers, boron fibers, basalt fibers, polyethylene fibers, polypropylene fibers, polyester fibers and/or natural fibers, with flax and sisal fibers being particularly preferred as natural fibers.

Carbon fibers are moreover preferred according to the invention because they have a good specific strength and a good specific modulus of elasticity. All types of carbon fibers can be used in the context of the invention, with carbon fibers having a high strength and high ultimate elongation being preferred. Carbon fibers having a tensile strength of 4.4 GPa or more and an elongation of 1.7% or more are particularly preferred. In addition to carbon fibers having a circular cross-section, fibers having non-circular cross-sections, such as for example triangles, squares, hollow shapes, multilamellar shapes and H shapes, can also be used.

Of the glass fibers, fibers of the S-glass, S2-glass, E-glass, R-glass, A-glass, AR-glass, C-glass, D-glass, ECR-glass or T-glass type as well as glass filaments, chopped glass fibers, hollow glass fibers and zirconium oxide glass fibers are preferred in particular.

The fibers used according to the invention can be processed as short fragments through to continuous fibers. In addition to the particularly preferred continuous fibers, fibers having a length of at least 5 mm, in particular at least 5 cm, have likewise proved to be particularly preferred.

Depending on the area of application of the later fiber composite material, the fibers can be arranged in different ways. Thus the fibers can have a random or an oriented arrangement, for example. Depending on the area of application, however, arrangements in the form of a woven fabric, a mat, a knitted fabric, a nonwoven fabric and/or a mesh can also be preferred. For applications requiring high strength and a high modulus of elasticity, fibers arranged in parallel in one direction are most suitable.

According to the invention the fibers can be present with no interlinking whatsoever. It can, however, also be preferable for the fibers to be woven together or to be fixed by means of a filament as a nonwoven fabric. The use of pressure-sensitive adhesives or binders, which cause the fibers to adhere to one another even before they are wetted with the two-component agents according to the invention, can also be preferred according to the invention.

Although in principle the fibers can be used according to the invention without pretreatment, a special pretreatment has proved advantageous. In addition to the pressure-sensitive adhesives already mentioned above, the fibers can be coated with a size, for example. Sizes that simultaneously improve the adhesion of the matrix to the fibers are particularly preferred according to the invention (for example coating with epoxy silanes).

The first process step that is substantial to the invention for producing the fiber composite material according to the invention is the mixing of the components of a multi-component agent (the mixing of components A and B in the case of a two-component agent); the product obtained by this measure is referred to below as the "resulting application preparation".

Prior to this mixing step, the constituents of the resulting application preparation can in principle be formulated in two or more components. The use of two or three separately packaged components is preferred according to the invention. The use of a two-component agent consisting of components A and B is most particularly preferred.

For example, the components of the multi-component agent can be conveyed with pumps out of storage vessels and mixed by means of a static mixer or dynamic mixer. However, mixing in the discharge zone of a multi-chamber cartridge, in particular a two-chamber cartridge, is also possible according to the invention.

According to the invention the mixing operation takes place immediately before use. According to the invention "immediately before use" is understood to mean that a period of less than 120 minutes, preferably from 0.01 second to 30 minutes, in particular from 1 second to 1 minute, elapses between mixing of the components and introduction into the mold.

As the first substantial constituent component A of the multi-component agents used according to the invention contains at least one compound having two or more isocyanate groups.

The difunctional isocyanates (diisocyanates), trifunctional isocyanates (triisocyanates) and/or polyisocyanates known for adhesive applications are suitable in particular as the "compound having two or more isocyanate groups" within the meaning of the present invention. "Polyisocyanates" are understood according to the invention to be compounds having more than three isocyanate groups. Compounds having two or more isocyanate groups per molecule are particularly preferred according to the invention. It has proved particularly preferable to use mixtures of compounds having two or more isocyanate groups, such as mixtures of oligomers for example.

In addition to the monomeric di-, tri- and/or polyisocyanates, the oligomeric and/or polymeric di-, tri- and/or polyisocyanates (reactive prepolymers) are also included among the "isocyanates" that are preferred according to the invention. An "oligomer" is understood according to the invention to be a compound having fewer than 4 repeating units. Correspondingly, a "polymer" is understood to be a compound having 4 or more repeating units.

Examples of suitable monomeric di-, tri- or polyisocyanates are 1,5-naphthylene diisocyanate, 2,2'-, 2,4- and/or 4,4'-diphenylmethane diisocyanate (MDI), hydrogenated MDI (H12 MDI), allophanates of MDI, xylylene diisocyanate (XDI), tetramethyl xylylene diisocyanate (TMXDI), 4,4'-diphenyldimethyl methane diisocyanate, di- and tetraalkylene diphenylmethane diisocyanate, 4,4'-dibenzyl diisocyanate, 1,3-phenylene diisocyanate, 1,4-phenylene diisocyanate, isomers of toluoylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexyl methane diisocyanate, cyclohexane-1,4-diisocyanate, ethylene diisocyanate, phthalic acid bis-isocyanatoethyl ester, trimethyl hexamethylene diisocyanate, 1,4-diisocyanatobutane, 1,12-diisocyanatododecane, dimer fatty acid diisocyanate. Aliphatic isocyanates such as hexamethylene diisocyanate, undecane-, dodecamethylene diisocyanate, 2,2,4-trimethylhexane-2,3,3-trimethyl hexamethylene, 1,3- or 1,4-cyclohexane diisocyanate, 1,3- or 1,4-tetramethyl xylene diisocyanate, isophorone diisocyanate, 4,4-dicyclohexylmethane, lysine ester diisocyanate or tetramethyl xylylene diisocyanate (TMXDI) are particularly suitable. Within this group the aliphatic diisocyanates can be particularly preferred. Derivatives and oligomers of 2,2'-, 2,4- and/or 4,4'-diphenylmethane diisocyanate and isomers of toluoylene diisocyanate, 1-isocyanatomethyl-3-isocyanato-1,5,5-trimethylcyclohexane and tetramethyl xylylene diisocyanate are moreover particularly preferred.

Difunctional isocyanates are preferred. At least small proportions of trifunctional isocyanates can also be used, however. Isocyanates that are produced by trimerization or oligomerization of diisocyanates or by reacting diisocyanates with polyfunctional compounds containing hydroxyl or amino groups are suitable as trifunctional isocyanates. Suitable isocyanates for producing trimers are the diisocyanates already mentioned above, the trimerization products of HDI, TMXDI or IPDI being particularly preferred. Also preferred according to the invention are the polymeric di-, tri- or polyisocyanates, such as in particular polymeric MDI, and mixtures of polymeric di-, tri- or polyisocyanates with monomeric di-, tri- or polyisocyanates.

Compounds according to the invention having two or more isocyanate groups with a polyester structure and/or polyether structure are particularly preferred. Compounds having two or more isocyanate groups with a polyether structure are most particularly preferred. Preferred examples are derivatives of polyethylene glycol, polypropylene glycol and/or polytetrahydrofuran. The epoxy adhesives provided with polyurethanes based on said isocyanates that are formed in situ during pre-curing are distinguished by a particularly advantageous combination of impact strength and dimensional stability before curing.

It has also proved advantageous for the compounds having two or more isocyanate groups to have an average molecular weight of less than 5000 g/mol, in particular less than 3000 g/mol. Compounds having two or more isocyanate groups with an average molecular weight of more than 150 g/mol, in particular more than 250 g/mol, are likewise preferred.

All stated molecular weight averages in the context of the present application are understood to be weight-average molecular weight ($M_w$), which is determined by gel permeation chromatography (GPC) using polystyrene as the standard.

Compounds having two or more isocyanate groups with an isocyanate equivalent weight from 80 g/eq to 2000 g/eq, in particular from 125 g/eq to 1000 g/eq, have proved to be preferable according to the invention in terms of their reactivity.

In a special embodiment it can moreover be preferable according to the invention for the compound having two or more isocyanate groups as a constituent of component A to contain substantially only capped isocyanate groups. The isocyanate groups are substantially in capped form if less than 10% of the isocyanate groups, preferably less than 5%, most particularly preferably less than 1% of the isocyanate groups are uncapped. This ensures that these compounds, after being mixed with the compounds which have at least two reactive groups, selected from hydroxyl groups, thiol groups, primary amino groups and secondary amino groups and are simultaneously free from epoxy groups, do not start to react spontaneously but instead react only when heated after wetting of the fibers.

The compounds already described above are suitable as a "compound having two or more capped isocyanate groups" within the meaning of the present invention, provided they have been reacted with corresponding thermally cleavable capping groups.

H-acid compounds are preferably used as thermally cleavable capping groups. The H-acid compounds preferably have functional groups selected from hydroxyl groups, secondary amino groups and CH-acid groups. Particularly preferred capping groups are low-aliphatic monoalcohols such as methanol, ethanol, propanol, butanol or octyl alcohol, monoethers of ethylene glycol and/or diethylene glycol, aromatic hydroxyl compounds such as phenol, alkyl phenols or (alkyl) cresols, 3,5-dimethylpyrazole, phenol, secondary amines, butane oxime, malonic esters and acetoacetate and derivatives thereof. Oximes such as acetone oxime, methyl ethyl ketone oxime and similar can also be used as blocking agents. Of the various lactam blocking agents, mention can be made in particular of ε-caprolactam; CH-acid β-dicarbonyl compounds such as malonic esters are also suitable as blocking agents. The person skilled in the art knows which combinations of capped isocyanates with compounds which have at least two reactive groups selected from hydroxyl groups, thiol groups, primary amino groups and secondary amino groups and are simultaneously free from epoxy groups must be used in order to establish the desired reaction temperature of the cyanate-based curing mechanism.

The at least one compound having two or more isocyanate groups is preferably included in an amount from 2 to 70 wt. %, in particular from 5 to 50 wt. %, relative in each case to the resulting application preparation.

Component A of the multi-component agents used according to the invention contains the compound(s) having two or more isocyanate groups preferably together with one or more additives. According to the invention an "additive" is understood to mean a further constituent that is packaged together with the isocyanate group-containing compound. According to the invention the nature of the further constituent is unimportant, i.e. the additive can for example be a further active ingredient, such as a hardener or an epoxide prepolymer for example, a pure filler or a compound that improves the storage stability of the isocyanate compound or binds the moisture during application.

It is moreover substantial according to the invention for component B of the multi-component agent used according to the invention to contain at feast one compound which has at least two reactive groups selected from hydroxyl groups, thiol groups, primary amino groups and secondary amino groups and is simultaneously free from epoxy groups.

Compounds are "free from epoxy groups" according to the invention if they contain no epoxy groups in the molecule. As part of the work carried out in support of this invention it has been found that the function of the compound having at least two reactive groups selected from hydroxyl groups, thiol groups, primary amino groups and secondary amino groups cannot be assumed by epoxide prepolymers also having a corresponding number of hydroxyl groups. Through the additional presence of the compounds that are substantial to the invention it is possible according to the invention to adjust the impact strength and the dimensional stability of the resulting fiber composite material in an optimal manner. Furthermore, the presence of the components that are substantial to the invention allows for an increase in the resistance to crack propagation and hence an improvement in ageing under cyclic loading.

Compounds having at least two reactive groups selected from hydroxyl groups and/or thiol groups are preferred according to the invention. Reactive —OH groups are most particularly preferred according to the invention. Correspondingly, it can be preferable for component B to contain at least one diol and/or polyol, preferably at least one polyol.

The polyols known from polyurethane technology having an average molecular weight of up to 50,000 g/mol can be selected as diols or polyols. They can be selected for example on the basis of polyethers, polyesters, polyolefins, polyacrylates or polyamides, wherein said polymers must additionally contain OH groups. Di- or trifunctional polyethylene polyether polyols are suitable for example.

Suitable polyether polyols are for example linear or branched polyethers having a plurality of ether bonds and containing at least two alcohol groups, preferably at the chain ends. They substantially contain no functional groups other than the OH groups. Such polyether polyols are formed as reaction products of low-molecular-weight polyfunctional alcohols with alkylene oxides. The alkylene oxides preferably have 2 to 4 C atoms. The reaction products of ethylene oxide, propylene oxide, butylene oxide or mixtures thereof with aliphatic dials, such as ethylene glycol, 1,2-propanediol, 1,3-propanediol, the isomeric butanediols, such as 1,2-butanediol, 1,3-butanediol, 1,4-butanediol and 2,3-butanediol, pentanediols and hexanediols, 2,2-dimethyl-1,3-propanediol, 2-methyl propanediol, polyglycerol, 1,6-hexanediol, 2,4,4-trimethyl hexanediol-1,6,2,2,4-trimethyl hexanediol-1,6,1,4-cyclohexane dimethanol, or aromatic diols, such as 4,4'-dihydroxydiphenylpropane, bisphenol A, bisphenol F, pyrocatechol, resorcinol, hydroquinone or mixtures of two or more thereof are suitable for example. Further polyols that are suitable within the context of the invention are formed by polymerization of tetrahydrofuran (poly-THF). The reaction products of polyfunctional alcohols such as glycerol, trimethylolethane or trimethylolpropane, pentaerythritol or sugar alcohols with the alkylene oxides are moreover also suitable. They have the same number of terminal OH groups as the starting alcohol.

Polyester polyols can also be used in place of or together with the polyether polyols. They are formed by a polycondensation reaction of a polyhydric alcohol having for example 2 to 15 C atoms and preferably 2 or 3 OH groups with one or more polycarboxylic acids, preferably those having 2 to 14 C atoms (including the C atoms in the carboxyl groups) and having 2 to 6 carboxyl groups. Dicarboxylic acids are preferred here that together with diols lead to linear polyester diols or together with trials lead to branched polyester triols. Conversely, branched polyester trials can also be obtained by reacting a diol with a tricarboxylic acid. The following, for example, can be used as the alcohol component of the polyester polyol: ethylene glycol, 1,2-propanediol, 1,3-propanediol, the isomeric butanediols, pentanediols, hexanediols, 2,2-dimethyl-1,3-propanediol, 2-methyl propanediol, 1,6-hexanediol, 2,4,4-trimethyl hexanediol-1,6,2,2,4-trimethyl hexanediol-1,6, cyclohexanediol-1,4,1,4-cyclohexane dimethanol, or aromatic diols, such as 4,4'-dihydroxydiphenyl propane, bisphenol A, bisphenol F, pyrocatechol, resorcinol, hydroquinone. Suitable carboxylic acids are for example: phthalic acid, isophthalic acid, terephthalic acid, maleic acid, dodecyl maleic acid, octadecenyl maleic acid, fumaric acid, aconitic acid, 1,2,4-benzene tricarboxylic acid, 1,2,3-propane tricarboxylic acid, malonic acid, succinic acid, glutaric acid, adipic acid, pimelic acid, sebacic acid, cyclohexane-1,2-dicarboxylic acid, 1,4-cyclohexadiene-1,2-dicarboxylic acid and others. In place of the carboxylic acids, anhydrides thereof can also be used.

By virtue of the crosslinking characteristics that are particularly suitable for the application according to the invention, it is preferable to use diisocyanates in combination with trifunctional polyols and/or aliphatic diols. Polyethylene polyether polyols and/or butanediols, in particular 1,4-butanediol, can be most particularly preferred representatives of the group of diols or polyols.

In a preferred embodiment of the present invention it has proved advantageous for the compound having two reactive groups selected from hydroxyl groups, thiol groups, primary amino groups and secondary amino groups to have a polyether structure. These are for example the corresponding derivatives of polyethylene glycol, polypropylene glycol and/or polytetrahydrofuran. The group of alkyl diols such as for example butanediol and hexanediol has moreover proved most particularly preferable according to the invention. These preferred polyols and diols have a particularly advantageous influence on the impact strength of the resulting adhesives.

It has moreover proved advantageous for the compound having at least two reactive groups selected from hydroxyl groups, thiol groups, primary amino groups and secondary amino groups to have a molecular weight average of less than 4000 g/mol, preferably less than 2000 g/mol. Compounds having at least two reactive groups selected from hydroxyl groups, thiol groups, primary amino groups and secondary amino groups and an average molecular weight of at least 60 g/mol, in particular at least 90 g/mol, are particularly preferred according to the invention.

According to the invention the ratio of isocyanate equivalent weight to hydroxyl equivalent weight is preferably in the range from 1:5 to 1.5:1.

Component B of the present invention preferably contains the compound which has at least two reactive groups selected from hydroxyl groups, thiol groups, primary amino groups and secondary amino groups and is simultaneously free from epoxy groups in an amount from 0.5 to 60 wt. %, in particular from 1.5 to 35 wt. %, relative in each case to the resulting application preparation comprising components A and B.

It can furthermore be preferable for component B to contain one or more diols and/or polyols in an amount from 0.5 to 60 wt. %, in particular from 1.5 to 35 wt %, relative in each case to the resulting application preparation.

Component B of the multi-component agents used according to the invention contains the compound(s) which have at least two reactive groups selected from hydroxyl groups, thiol groups, primary amino groups and secondary amino groups and are simultaneously free from epoxy groups, preferably together with one or more additives. According to the invention an "additive" is understood to mean a further constituent that is packaged together with the OH, SH or NH group-containing compound. According to the invention the nature of the further constituent is unimportant, i.e. the additive can for example be a further active ingredient, such as a hardener or an epoxide prepolymer for example, a pure filler or a compound that improves the storage stability of component B.

As the third substantial constituent at least one of the components of the multi-component agent contains at least one epoxide prepolymer. In the case of a two-component agent it can be preferable for component A and/or component B to contain an epoxide prepolymer.

The epoxide prepolymers, also referred to below as "epoxide resins", can in principle be saturated, unsaturated, cyclic or acyclic, aliphatic, alicyclic, aromatic or heterocyclic polyepoxide compounds.

Suitable epoxide resins are selected for example from epoxide resins of the bisphenol A type, epoxide resins of the bisphenol S type, epoxide resins of the bisphenol F type, epoxide resins of the phenol-novolak type, epoxide resins of the cresol-novolak type, epoxidized products of numerous dicyclopentadiene-modified phenolic resins, obtainable by reacting dicyclopentadiene with numerous phenols, epoxidized products of 2,2',6,6'-tetramethylbiphenol, aromatic epoxide resins such as epoxide resins having a naphthalene framework and epoxide resins having a fluorene framework, aliphatic epoxide resins such as neopentyl glycol diglycidyl ether and 1,6-hexanediol diglycidyl ether, alicyclic epoxide resins such as 3,4-epoxycyclohexylmethyl-3,4-epoxycyclohexane carboxylate and bis(3,4-epoxycyclohexyl)adipate and epoxide resins having a heterocyclic ring such as triglycidyl isocyanurate. In particular the epoxide resins encompass for example the reaction product of bisphenol A and epichlorohydrin, the reaction product of phenol and formaldehyde (novolak resins) and epichlorohydrin, glycidyl esters and the reaction product of epichlorohydrin and p-aminophenol.

Further polyphenols that yield suitable epoxide resin prepolymers by reaction with epichlorohydrin (or epibromohydrin) are: resorcinol, 1,2-dihydroxybenzene, hydroquinone, bis(4-hydroxyphenyl)-1,1-isobutane, 4,4'-dihydroxybenzophenone, bis(4-hydroxyphenyl)-1,1-ethane and 1,5-hydroxynaphthalene.

Further suitable epoxide prepolymers are polyglycidyl ethers of polyalcohols or diamines. Such polyglycidyl ethers derive from polyalcohols, such as for example ethylene glycol, diethylene glycol, triethylene glycol, 1,2-propylene glycol, 1,4-butylene glycol, triethylene glycol, 1,5-pentanediol, 1,6-hexanediol or trimethylolpropane.

Further preferred epoxide resins that are commercially available encompass in particular octadecylene oxide, epichlorohydrin, styrene oxide, vinyl cyclohexene oxide, glycidol, glycidyl methacrylate, diglycidyl ethers of Bisphenol A (e.g. those that are obtainable under the trade names "Epon 828", "Epon 825", "Epon 1004" and "Epon 1010" from Hexion Specialty Chemicals Inc., "DER-331", "DER-332", "DER-334", "DER-671", "DER-732" and "DER-736" from Dow Chemical Co.), vinyl cyclohexene dioxide, 3,4-epoxycyclohexylmethyl-3,4-epoxycyclohexene carboxylate, 3,4-epoxy-6-methylcyclohexylmethyl-3,4-epoxy-6-methyl cyclohexene carboxylate, bis(3,4-epoxy-6-methylcyclohexylmethyl)adipate, bis(2,3-epoxycyclopentyl)ether, aliphatic, polypropylene glycol-modified epoxide, dipentene dioxide, epoxidized polybutadiene (e.g. cresol products from Sartomer), silicone resin containing epoxide functionalities, flame-retardant epoxide resins (e.g. "DER-580", a brominated epoxide resin of the bisphenol type, obtainable from Dow Chemical Co.), 1,4-butanediol diglycidyl ethers of a phenol-formaldehyde novolak (e.g. "DEN-431" and "DEN-438" from Dow Chemical Co.), and resorcinol diglycidyl ethers (e.g. "Kopoxite" from Koppers Company Inc.), bis(3,4-epoxycyclohexyl) adipate, 2-(3,4-epoxycyclohexyl-5,5-spiro-3,4-epoxy)cyclohexane metadioxane, vinyl cyclohexene monoxide, 1,2-epoxyhexadecane, alkyl glycidyl ethers such as for example C8-C10 alkyl glycidyl ethers (e.g. "HELOXY Modifier 7" from Hexion Specialty Chemicals Inc.), C12-C14 alkyl glycidyl ethers (e.g. "HELOXY Modifier 8" from Hexion Specialty Chemicals Inc.), butyl glycidyl ethers (e.g. "HELOXY Modifier 61" from Hexion Specialty Chemicals Inc.), cresyl glycidyl ethers (e.g. "HELOXY Modifier 62" from Flexion Specialty Chemicals Inc.), p-tert-butylphenyl glycidyl ethers (e.g. "HELOXY Modifier 65" from Hexion Specialty Chemicals Inc.), polyfunctional glycidyl ethers such as for example diglycidyl ethers of 1,4-butanediol (e.g. "HELOXY Modifier 67" from Hexion Specialty Chemicals Inc.), diglycidyl ethers of neopentyl glycol (e.g. "HELOXY Modifier 68" from Hexion Specialty Chemicals Inc.), diglycidyl ethers of cyclohexane dimethanol (e.g. "HELOXY Modifier 107" from Hexion Specialty Chemicals Inc.), trimethylolethane triglycidyl ethers (e.g. "HELOXY Modifier 44" from Flexion Specialty Chemicals Inc.), trimethylolpropane triglycidyl ethers (e.g. "HELOXY Modifier 48" from Hexion Specialty Chemicals Inc.), polyglycidyl ethers of an aliphatic polyol (e.g. "HELOXY Modifier 84" from Hexion Specialty Chemicals Inc.), polyglycol diepoxide (e.g. "HELOXY Modifier 32" from Hexion Specialty Chemicals Inc.), bisphenol F epoxides (e.g. "EPN-1138" or GY-281" from Huntsman Int. LLC), 9,9-bis-4-(2,3-epoxypropoxy)phenyl fluorenone (e.g. "Epon 1079" from Hexion Specialty Chemicals Inc.).

Further preferred commercially available compounds are selected for example from Araldite™ 6010, Araldite™ GY-281™, Araldite™ ECN-1273, Araldite™ ECN-1280, Araldite™ MY-720, RD-2 from Huntsman Int. LLC; DEN™ 432, DEN™ 438, DEN™ 485 from Dow Chemical Co., Epon™ 812, 826, 830, 834, 836, 871, 872, 1001, 1002, 1031 etc. from Hexion Specialty Chemicals Inc. and HPT™ 1071, HPT™ 1079 likewise from Hexion Specialty Chemicals Inc., as novolak resins also for example Epi-Rez™ 5132 from Hexion Specialty Chemicals Inc., ESCN-001 from Sumitomo Chemical, Quatrex 5010 from Dow Chemical Co., RE 305S from Nippon Kayaku, Epiclon™ N673 from DaiNippon Ink Chemistry or Epicote™ 152 from Hexion Specialty Chemicals Inc.

In particular the polyfunctional epoxide prepolymers such as for example the novolak resins and the derivatives of tetraphenylolethane have proved to be preferred resins according to the invention for achieving an increase in the glass transition temperature and an associated improvement in the mechanical properties.

It can moreover be preferable according to the invention to use epoxide prepolymers that are substantially free from hydroxyl groups. Epoxide prepolymers are substantially free from hydroxyl groups if they have a hydroxyl equivalent weight of at least 4000 g/eq, such as for example the product sold under the trade name DER-332.

Furthermore, at least small proportions of the following polyepoxides can additionally be used: polyglycidyl esters of polycarboxylic acids, for example reaction products of glycidol or epichlorohydrin with aliphatic or aromatic polycarboxylic acids such as oxalic acid, succinic acid, glutaric acid, terephthalic acid or dimer fatty acid.

The epoxide equivalent of suitable polyepoxides can vary between 150 and 50,000, preferably between 170 and 5000. For example, an epoxide resin based on epichlorohydrin/bisphenol A that has an epoxide equivalent weight of 475 to 550 g/eq or an epoxy group content in the range from 1820 to 2110 mmol/g is suitable. The softening point determined in accordance with RPM 108-C is in the range from 75 to 85° C.

The multi-component agents used according to the invention can contain at least one epoxide prepolymer that is liquid at room temperature (22° C.). This lowers the viscosity of the premix and thus makes it easier to introduce the premix into the mold.

It is therefore preferable for at least one of components A or B, preferably both component A and component B, to contain an epoxide prepolymer that is liquid at 22° C.

It can however also be preferable for only one of components A or B, preferably component B, to contain an epoxide prepolymer that is liquid at 22° C.

Reaction products of epichlorohydrin with bisphenol A or bisphenol F are preferably used as epoxide prepolymers that are liquid at room temperature. The epoxide resins that are liquid at room temperature generally have an epoxide equivalent weight from approximately 150 g/eq to approximately 480 g/eq. An epoxide equivalent weight range from 182 g/eq to 350 g/eq is particularly preferred.

It can likewise be preferable, however, for at least one of components A or B, preferably at least component B, to contain in addition to the epoxide prepolymer that is liquid at 22° C. an epoxide prepolymer that is solid or semi-solid at 22° C. This helps to ensure that the moldings have the necessary strength after pre-curing, and it reduces the tackiness of the moldings in comparison to moldings containing only liquid epoxide resin prepolymers.

The epoxide resins that are solid at room temperature (22° C.) are likewise obtainable from polyphenols and epichlorohydrin. Those based on bisphenol A or bisphenol F and having a melting point between 45° C. and 90° C., preferably between 50° C. and 80° C., are particularly preferred. The latter differ from the liquid epoxide resins substantially through their higher molecular weight, which causes them to solidify at room temperature. According to the invention the solid epoxide resins have an epoxide equivalent weight of 400 g/eq. An epoxide equivalent weight from 450 g/eq to approximately 900 g/eq is particularly preferred. At 22° C., the properties of semi-solid epoxide resins are between those of solid and of liquid epoxide resins. Unlike liquid epoxide resins, they do not assume the shape of the vessel within 10 minutes under the influence of gravity and form a substantially smooth surface, but they are dimensionally stable under the influence of gravity for at least 10 minutes. They can however be deformed under manually exerted pressure without breaking, or on release of the pressure they at least approximately assume their original shape again. Semi-solid epoxide resins are therefore readily manually deformable, but not elastic.

In a most particularly preferred embodiment it has proved advantageous for only component B to contain an epoxide resin, in other words for component A to be formulated free from epoxide resins. Preparations are "free from epoxide resins" according to the invention if they contain less than 3 wt. %, preferably less than 1 wt. %, most particularly preferably less than 0.1 wt. % of an epoxide resin. Such compositions are distinguished in particular by an increased storage stability.

The multi-component agents according to the invention can optionally also contain as further epoxide prepolymers reactive thinners to adjust the flow characteristics. Reactive thinners within the meaning of this invention are low-viscosity substances (glycidyl ethers or glycidyl esters) containing epoxy groups and having an aliphatic or aromatic structure. Typical examples of reactive thinners are mono-, di- or triglycidyl ethers of $C_6$ to $C_{14}$ monoalcohols or alkyl phenols and the monoglycidyl ethers of cashew nut shell oil, diglycidyl ethers of ethylene glycol, diethylene glycol, triethylene glycol, tetraethylene glycol, propylene glycol, dipropylene glycol, tripropylene glycol, tetrapropylene glycol, neopentylene glycol, 1,4-butylene glycol, 1,5-pentanediol, 1,6-hexanediol, cyclohexane dimethanol, triglycidyl ethers of trimethylolpropane and the glycidyl esters of $C_6$ to $C_{24}$ carboxylic acids or mixtures thereof.

The multi-component agents of the present invention preferably contain the epoxide prepolymers in an amount from 20 to 90 wt. %, in particular from 40 to 80 wt. %, relative in each case to the resulting application preparation.

It can be preferable according to the invention for up to 25 wt. %, in particular 0 to 10 wt. %, of the epoxide prepolymers contained in the resulting application preparation to be reactive thinners.

It can be preferable according to the invention for the epoxide prepolymers to be incorporated entirely into component B. Alternatively, however, it can also be preferable for both component A and component B to contain epoxide prepolymers. It has proved advantageous for 10 to 90% of the entire epoxide material to be incorporated into component A and for the remaining 90 to 10% of the entire epoxide material to be incorporated into component B.

It has further proved advantageous for the resulting application preparation to have a higher proportion by weight of epoxide prepolymers than of components involved in the pre-curing mechanism. For other application areas, however, a reverse proportion (lower proportion by weight of epoxide prepolymers than of components involved in the pre-curing mechanism) can be preferred.

It is moreover substantial to the invention that the resulting mixture contains a latent hardener for epoxide prepolymers.

According to the invention the "resulting mixture" is understood to be the mixture of components in the mold following the introduction of the resulting application preparation. It is substantially composed of the constituents of the resulting application preparation, the fibers and the further additives that were placed in the mold, such as for example latent hardeners for epoxide prepolymers, curing accelerators for epoxide prepolymers, fillers, drying agents or thixotropic agents.

According to the invention a latent hardener (or a hardener that is capable of being heat activated) is understood to be a compound that can be stored at 22° C. together with the epoxide prepolymers without the curing reaction being started to any appreciable extent. The molecular structure of the latent hardeners changes only above 80° C., preferably above 100° C., such that above this temperature such compounds act as hardeners and start and/or accelerate the polymerization reaction of the epoxide prepolymers.

In a first preferred embodiment at least one of the components of the multi-component agent contains at least one latent hardener for epoxide prepolymers. In the case of the two-component agents it is preferable for component A and/or component B to contain a latent hardener for epoxide prepolymers. It can, however, also be preferable to formulate the hardener for epoxide prepolymers as a separate component C.

In a second preferred embodiment of this subject matter of the present invention, the fibers are placed in the mold together with at least one latent hardener for epoxide prepolymers. It makes no substantial difference whether the fibers are coated with the latent hardener for epoxide prepolymers or whether this is introduced separately into the mold. In the context of this embodiment at least one of the components of the multi-component agent (preferably component A and/or B of a two-component agent) can additionally contain a latent hardener for epoxide prepolymers. It can, however, also be preferable for the components of the multi-component agent to be formulated free from latent hardeners for epoxide prepolymers.

The latent hardeners can be selected from the following compounds, for example: guanidines, substituted guanidines, substituted ureas, melamine resins, guanamine derivatives, cyclic tertiary amines, aromatic amines and/or mixtures thereof. The hardeners can be incorporated stoichiometrically into the curing reaction, but they can also be catalytically active. Examples of substituted guanidines are methylguanidine, dimethylguanidine, trimethylguanidine, tetramethylguanidine, methyl isobiguanidine, dimethyl isobiguanidine, tetramethyl isobiguanidine, hexamethyl isobiguanidine, heptamethyl isobiguanidine and most particularly cyanoguanidine (dicyandiamide). Alkylated benzoguanamine resins, benzoguanamine resins or methoxymethyl ethoxymethyl benzoguanamine are mentioned as representatives of suitable guanamine derivatives. Moreover, 3,3-diaminodiphenylsulfone and 4,4-diaminodiphenylsulfone and derivatives thereof or ionic liquids (imidazolium salts), such as Baxxodur® ECX-2450 for instance, can be used as latent hardeners. The compounds known under the trade names Ancamine® 2014, Ancamine® 2337, Adeka® EH-4357 and Adeka® EH-4360 are also preferred according to the invention. Microencapsulated systems such as are sold under the trade name Novacure® by Asahi Denka are also preferred according to the invention. Dicyandiamide is most particularly preferably suitable.

Phenolic hardeners such as are sold by Hexion under the trade name Durite® (in particular Durite® SD 1713 and Durite® SC-1008) are moreover particularly preferred according to the invention.

A further group of preferred hardeners is formed by imidazoles, anhydrides and common adducts thereof.

Preferred imidazoles according to the invention are the imidazoles that are unsubstituted at the N-atom, such as for example 2-phenyl-4-methylimidazole, 2-phenylimidazole and imidazole. Further preferred imidazole components according to the invention are the alkyl-substituted imidazoles, N-substituted imidazoles and mixtures thereof.

Preferred anhydrides according to the invention are the cycloaliphatic anhydrides such as for example pyromellitic acid dianhydride, which is commercially available from Aldrich as PMDA. Further preferred anhydrides are methylhexahydrophthalic acid anhydride (commercially available from Lonza Inc. Intermediates and Actives as MHHPA), methyltetrahydrophthalic acid anhydride, nadic methyl anhydride, hexahydrophthalic acid anhydride, tetrahydrophthalic acid anhydride, phthalic acid anhydride, dodecyl succinic acid anhydride, bisphenyl dianhydrides, benzophenone tetracarboxylic acid dianhydrides and mixtures thereof.

Particularly preferred imidazole anhydride adducts are a complex comprising 1 part 1,2,4,5-benzenetetracarboxylic acid anhydride and 4 parts 2-phenyl-4-methylimidazole, and a complex comprising 1 part 1,2,4,5-benzenetetracarboxylic acid dianhydride and 2 parts 2-phenyl-4-methylimidazole. The adducts are obtained by dissolving the components in a suitable solvent, such as for example acetone, under exposure to heat. The product precipitates out of the solution after being cooled.

Nadic methyl anhydride is a most particularly preferred anhydride hardener according to the invention.

To increase the homogeneity of the fiber composite material it has proved advantageous if the latent hardener for epoxide prepolymers is liquid or in a dissolved state at the application temperature, particularly if it is incorporated into the components of the multi-component agent. This ensures that it is not held back by the fibers and filtered out when it is introduced into the mold.

According to the invention a latent hardener for epoxide prepolymers is in a "liquid" state if at the time of introduction into the three-dimensional mold it has a viscosity from 0.001 Pa*s to 10,000 Pa*s, in particular from 0.01 Pa*s to 8000 Pa*s, at the application temperature and under normal pressure (measurement conditions: rotary rheometer with a plate/plate geometry (PP20), shear rate 100 s$^{-1}$, material coating thickness 0.2 mm). It has proved advantageous according to the invention if the latent hardener for epoxide prepolymers is liquid at a temperature below 85° C., preferably at a temperature below 50° C., in particular at a temperature below 30° C. It is further preferable if the resulting application preparation is introduced into the mold at a temperature below 85° C., preferably at a temperature below 50° C., in particular at a temperature below 30° C.

It has proved particularly advantageous according to the invention if the latent hardener for epoxide prepolymers is not contained in component A of the multi-component agent, so that an undesired reaction with the compounds having two or more isocyanate groups can be avoided. In the case of the two-component agent the latent hardener for epoxide prepolymers is preferably contained in component B.

According to the invention the latent hardeners are preferably included in an amount from 0.5 to 30 wt. %, in particular from 1 to 10 wt. %, relative in each case to the resulting application preparation. If the hardener is placed in the mold, this is preferably done in amounts such that a corresponding proportion by weight is established after the resulting application preparation is introduced into the mold.

In addition to the aforementioned hardeners, catalytically active substituted ureas can be used according to the invention. These are in particular p-chlorophenyl-N,N-dimethyl urea (monuron), 3-phenyl-1,1-dimethyl urea (fenuron) or 3,4-dichlorophenyl-N,N-dimethyl urea (diuron). Catalytically active tertiary acrylic or alkyl amines, such as for example benzyl dimethylamine, tris(dimethylamino)phenol, piperidine or piperidine derivatives, can also be used in principle. Furthermore, various preferably solid imidazole derivatives can be used as catalytically active accelerators. 2-Ethyl-2-methyl imidazole, N-butyl imidazole, benzimidazole and N—$C_1$ to $C_{12}$ alkyl imidazoles or N-aryl imidazoles are mentioned as representatives. Adducts of amino compounds with epoxide resins are also suitable as accelerating additives for the aforementioned hardeners. Suitable amino compounds are tertiary aliphatic, aromatic or cyclic amines. Suitable epoxy compounds are for example polyepoxides based on glycidyl ethers of bisphenol A or F or of resorcinol. Specific examples of such adducts are adducts of tertiary amines such as 2-dimethyl aminoethanol, N-substituted piperazines, N-substituted homopiperazines, N-substituted aminophenols with di- or polyglycidyl ethers of bisphenol A or F or of resorcinol.

In the context of the present invention it is preferable but not absolutely necessary for at least one of components A and B, preferably component B, additionally to contain one such curing accelerator for epoxide prepolymers, in particular adducts of amino compounds with epoxide resins or derivatives of urea, such as fenuron for example.

According to the invention the curing accelerators for epoxide prepolymers are preferably included in an amount from 0 to 5 wt. %, in particular from 0.1 to 2 wt. %, relative in each case to the resulting application preparation. It can moreover be preferable for the curing accelerator to be formulated together with the latent hardener in a separate component C.

It can however also be preferable to place the curing accelerators in the mold together with the fibers. If the curing accelerator is placed in the mold, this is preferably done in amounts such that a corresponding proportion by weight is established after the resulting application preparation is introduced into the mold.

To accelerate the pre-curing of the combined premixes to form polyurethane it is preferable for at least one of the components of the multi-component agent (preferably not component A) additionally to contain a curing catalyst for isocyanates. Dialkyl tin dicarboxylates, such as for example dibutyl tin dicarboxylates, are suitable for this purpose for example. The carboxylate groups can be selected from those having in total (i.e. including the carboxyl group) 2 to 18 C atoms. Acetic acid, propionic acid, butyric acid, valeric acid, hexanoic acid, octanoic acid, decanoic acid, lauric acid, palmitic acid and stearic acid for example are suitable as carboxylic acids for forming carboxylates. Dibutyl tin dilaurate is suitable in particular. Furthermore, organometallic compounds based on bismuth and zinc such as for example bismuth zinc neodecanoate or alternatively purely organic accelerators such as dimethyl benzylamine or diazabicyclooctane can be used. It can moreover be preferable to use curing catalysts for isocyanates, the activity of which is delayed in comparison to the free catalyst, in other words the activity of which increases sharply under exposure to heat, for example. Thermally decomplexing metal chelates are an example of such curing catalysts. One embodiment is for example the zirconium chelate K-Kat A209 from King Industries, which is doped with pentane-2,4-diose.

According to the invention such curing catalysts for isocyanates are preferably included in an amount from 0 to 3 wt. %, in particular from 0.02 to 0.5 wt. %, relative in each case to the resulting application preparation. In the case of the two-component agents it has proved advantageous for the curing catalysts for isocyanates to be contained in component B.

It has moreover proved advantageous according to the invention for the components of the multi-component agent to be packaged free from blowing agents that are capable of being heat activated. According to the invention the components are "free from blowing agents that are capable of being heat activated" if less than 0.3 wt. %, preferably 0 wt. %, of a blowing agent that is capable of being heat activated has been added to them, relative in each case to the resulting application preparation. It is moreover preferable according to the invention if the resulting mixture and the pre-cured fiber composite material are also free from blowing agents that are capable of being heat activated.

In a further preferred embodiment at least one of the components of the multi-component agent contains at least one toughener. In the case of the two-component agents according to the invention component A and/or component B preferably contains a toughener. Such tougheners improve the fracture behavior of the fiber composite materials according to the invention and are known to the person skilled in the art in the field of epoxy adhesives. They can be selected for example from: thermoplastic isocyanates or polyurethanes, rubber particles, in particular those having a core-shell structure, and block copolymers, in particular those containing a first polymer block having a glass transition temperature of less than 15° C. and a second polymer block having a glass transition temperature of greater than 25° C. Such block copolymers are preferably selected from those in which a first polymer block is selected from a polybutadiene or polyisoprene block and a second polymer block is selected from a polystyrene or a polymethyl methacrylate block. Specific examples thereof are block copolymers having the following block structure: styrene-butadiene-(meth)acrylate, styrene-butadiene-(meth)acrylic acid ester, ethylene-(meth)acrylic acid ester-glycidyl(meth)acrylic acid ester, ethylene-(meth)acrylic acid ester-maleic anhydride, methyl methacrylate-butyl acrylate-methyl methacrylate.

Tougheners that are preferred according to the invention are furthermore rubber particles having a core-shell structure with a core made from a polymer material having a glass transition temperature of less than 0° C. and a shell made from a polymer material having a glass transition temperature of greater than 25° C. Particularly suitable rubber particles having a core-shell structure can have a core made from a diene homopolymer, a diene copolymer or a polysiloxane elastomer and/or a shell made from an alkyl(meth)acrylate homopolymer or copolymer.

For example, the core of these core-shell particles can contain a diene homopolymer or copolymer, which can be selected from a homopolymer of butadiene or isoprene, a copolymer of butadiene or isoprene with one or more ethylenically unsaturated monomers, such as for example vinyl aromatic monomers, (meth)acrylonitrile, (meth)acrylates or similar monomers. The polymer or copolymer of the shell can contain as monomers for example: (meth)acrylates, such as in particular methyl methacrylate, vinyl aromatic monomers (for example styrene), vinyl cyanides (for example acrylonitrile), unsaturated acids or anhydrides (for example acrylic acid), (meth)acrylamides and similar monomers, which lead to polymers having a suitable high glass transition temperature.

The polymer or copolymer of the shell can contain acid groups, which can crosslink by metal carboxylate formation, for example by salt formation with divalent metal cations. The polymer or copolymer of the shell can furthermore be covalently crosslinked by using monomers having two or more double bonds per molecule.

Other rubber-like polymers can be used as the core, such as for example polybutyl acrylate or polysiloxane elastomers, such as for example polydimethyl siloxane, in particular crosslinked polydimethyl siloxane.

These core-shell particles are typically constructed in such a way that the core makes up 50 to 95 wt. % of the core-shell particle and the shell makes up 5 to 50 wt. % of this particle.

These rubber particles are preferably relatively small. For example, the average particle size (determinable by light scattering methods for example) can be in the range from approximately 0.03 to approximately 2 μm, in particular in the range from approximately 0.05 to approximately 1 μm. Smaller core-shell particles can however likewise be used, for example those whose average diameter is less than approximately 500 nm, in particular less than approximately 200 nm. The average particle size can for example 11e in the range from approximately 25 to approximately 200 nm.

The production of such core-shell particles is known in the prior art, as is indicated for example in WO 2007/025007 on page 6, lines 16 to 21. Commercial supply sources for such core-shell particles are listed in this document in the last paragraph of page 6 to the first paragraph of page 7. Reference is hereby made to these supply sources. Reference is moreover made to production methods for such particles, which are described in the cited document from page 7, second paragraph to page 8, first paragraph. For more information on suitable core-shell particles reference is likewise made to the cited document WO 2007/025007, which contains detailed information on this subject from page 8, line 15 to page 13, line 15.

Inorganic particles having a shell made from organic polymers can take on the same function as the aforementioned rubber particles having a core-shell structure.

In this embodiment the multi-component agent used according to the invention preferably contains inorganic particles having a shell made from organic polymers, the organic polymers being selected from homopolymers or copolymers of acrylic acid and/or methacrylic acid esters and containing at least 30 wt. % of acrylic acid and/or methacrylic acid esters incorporated by polymerization.

The acrylic acid and/or methacrylic acid esters are preferably methyl and/or ethyl esters, wherein at least a proportion of the esters is particularly preferably present as methyl ester. The polymers can additionally also contain unesterified acrylic acid and/or methacrylic acid, which can improve the binding of the organic polymers to the surface of the inorganic particles. In this case it is therefore particularly preferable for the monomer units of unesterified acrylic and/or methacrylic acid to be located at (or near to) the end of the polymer chain that binds to the surface of the inorganic particles.

It is preferable here for the organic polymers to be made up of at least 80 wt. % acrylic acid and/or methacrylic acid esters. In particular they can be made up of 90 wt. %, 95 wt. % or entirely thereof. If the organic polymers contain monomers other than said acrylic acid and/or methacrylic acid esters or unesterified acrylic acid and/or methacrylic acid, they are preferably selected from comonomers having epoxy, hydroxyl and/or carboxyl groups.

The organic polymers of the shell are preferably uncrosslinked or so weakly crosslinked that no more than 5% of monomer units of one chain are crosslinked with monomer units of another chain. It can be advantageous here for the polymers in the vicinity of the surface of the inorganic particles to be more strongly crosslinked than those further outside in the shell. In particular the shell is preferably constructed in such a way that at least 80%, in particular at least 90% and particularly preferably at least 95% of the polymer chains are bound by one end to the surface of the inorganic particles.

Before the shell of organic polymers is applied, the inorganic particles preferably have an average particle size in the range from 1 to 1000, in particular in the range from 5 to 30 nm. It is known that the particle size can be determined by light scattering methods and by electron microscopy.

The shell of organic polymers has a lower density than the inorganic particles themselves. The shell of organic polymers preferably has a thickness such that the weight ratio of the inorganic core to the shell of organic polymers is in the range from 2:1 to 1:5, preferably in the range from 3:2 to 1:3. This can be controlled by the choice of reaction conditions when growing the shell of organic polymers onto the inorganic particles.

In general the inorganic particles can be selected from metals, oxides, hydroxides, carbonates, sulfates and phosphates. Mixed forms of oxides, hydroxides and carbonates, such as for example basic carbonates or basic oxides, can also be present. If inorganic particles of metals are chosen, iron, cobalt, nickel or alloys comprising at least 50 wt. % of one of these metals are preferably suitable. Oxides, hydroxides or mixed forms thereof are preferably selected from those of silicon, cerium, cobalt, chromium, nickel, zinc, titanium, iron, yttrium, zirconium and/or aluminum. Mixed forms of these too are possible, such as for example particles of alumosilicates or of siliceous glasses. Zinc oxide, aluminum oxides or hydroxides and $SiO_2$ and the oxide forms of silicon referred to as silica are particularly preferred. The inorganic particles can moreover consist of carbonates, such as for example calcium carbonate, or of sulfates, such as for example barium sulfate. It is naturally also possible for particles having differently constituted inorganic cores to be present side by side.

The method described in WO 2004/111136 A1 by reference to the example of coating zinc oxide with alkylene ether carboxylic acids can be used for example to produce the inorganic particles having a shell of organic polymers. According to this processing mode the untreated inorganic particles are suspended in a non-polar or scarcely polar solvent, then monomeric or prepolymeric constituents of the shell are added, the solvent is removed, and polymerization is started, radically or photochemically for example. Furthermore, it is possible to proceed in an analogous manner to the production method described in EP 1 469 020 A1, wherein monomers or prepolymers of the shell material are used as the organic coating component for the particles. Furthermore, a production of the encapsulated particles by atom transfer radical polymerization is possible, as described by way of example in relation to the polymerization of n-butyl acrylate onto silica nanoparticles in: G. Carrot, S. Diamanti, M. Manuszak, B. Charleux, J.-P. Vairon: "Atom Transfer Radical Polymerization of n-Butyl Acrylate from Silica Nanoparticles", J. Polym. Sci., Part A: Polymer Chemistry, Vol. 39, 4294-4301 (2001).

Furthermore, production methods as described in WO 2006/053640 can be used. For the present invention inorganic cores should be selected such as are described in WO 2006/053640 from page 5, line 24 to page 7, line 15 along with their production methods. The coating of these cores takes place in an analogous manner to the description given in this document from page 10, line 22 to page 15, line 7. The proposal in this document for pretreating the inorganic cores prior to application of the shell by polymerization can also be followed (page 15, lines 9 to 24). Said document states here in this regard:

"In particular where inorganic cores are used, it may also be preferable for the core to be subjected to pretreatment which enables binding of the shell before the shell is applied by polymerization. This can conventionally consist in a chemical functionalization of the particle surface, as is known from the literature for a very wide variety of inorganic materials. It may preferably involve in particular the application to the surface of such chemical functions which as a reactive chain end allow grafting of the shell polymers. Terminal double bonds, epoxy functions and polycondensable groups can be mentioned here in particular as examples. The functionalization of hydroxyl group-bearing surfaces with polymers is known for example from EP-A-337 144."

According to the invention the material contains at least one block copolymer as an additional component e). This is preferably selected from those containing a first polymer block having a glass transition temperature of less than 15° C., in particular less than 0° C., and a second polymer block having a glass transition temperature of greater than 25° C., in particular greater than 50° C. Furthermore, block copolymers are suitable that are selected from those in which a first polymer block is selected from a polybutadiene or polyisoprene block and a second polymer block is selected from a polystyrene or a polymethyl methacrylate block.

The block copolymer (e) is selected for example from copolymers having the following block structure: styrene-butadiene-(meth)acrylate, styrene-butadiene-(meth)acrylic acid ester, ethylene-(meth)acrylic acid ester-glycidyl(meth) acrylic acid ester, ethylene-(meth)acrylic acid ester-maleic anhydride, (meth)acrylic acid ester-butyl acrylate-(meth) acrylic acid ester, preferably methyl methacrylate-butyl acrylate-methyl methacrylate.

The aforementioned block copolymers correspond to those which can also be used in the context of the already cited WO 2007/025007. More details thereof and further block copolymers that are also suitable in the context of the present invention can be taken from this document from page 25, line 21 to page 26, line 9. Cross-references to documents in which the production of such block copolymers is described can also be found there.

The composition of these block copolymers is defined above by indicating the monomer unit for each block. This should be understood to mean that the block copolymer contains polymer blocks made from the cited monomers. Up to 20 mol % of the cited monomers in the individual polymer blocks can be replaced by other comonomers. This applies in particular to blocks of polymethyl methacrylate.

The cited block copolymers improve the impact strength of the cured materials according to the invention, in particular at temperatures below 0° C.

According to the invention it has been proved that the impact strength of the resulting fiber composite material can be further improved if the toughener is formulated together with the epoxide prepolymers in a component, in particular in component B in the case of the two-component agents used according to the invention.

The tougheners are preferably included in an amount from 0 to 50 wt. %, in particular from 5 to 20 wt. %, relative in each case to the resulting application preparation.

It has moreover proved advantageous according to the invention for the resulting application preparation to be formulated free from solid particles. According to the invention the resulting application preparation is "free from solid particles" if less than 0.3 wt. %, preferably 0 wt. %, of a solid particle has been added to the components of the multi-component agent, relative in each case to the total resulting application preparation.

According to the invention "solid particles" are understood to be all constituents that are solid at the time of introduction into the mold at the application temperature and under normal pressure. Such particles having an average particle size greater than 200 nm are particularly undesirable according to the invention. It has proved advantageous according to the invention if the resulting application preparation contains no particles that are solid at a temperature below 85° C., preferably at a temperature below 50° C., in particular at a temperature below 30° C.

The average particle size (D50 volume average) of the solid particles can be determined by conventional methods, for example by light scattering. The D50 volume average is the point in the particle size distribution at which 50 vol. % of the particles have a smaller diameter and 50 vol. % of the particles have a larger diameter.

These particles can include fillers, thixotropic agents and/or drying agents, for example.

In an alternative embodiment of the present invention it can be preferable, however, for the resulting application preparation to contain at least one filler and/or thixotropic agent and/or drying agent having an average particle size less than 150 nm, in particular less than 50 nm, most particularly less than 20 nm.

As a rule the known fillers such as for example the various ground or precipitated chalks, carbon black, calcium magnesium carbonates, talc, kaolins, barytes and in particular siliceous fillers of the aluminum magnesium calcium silicate type, e.g. wollastonite, bentonite, chlorite, are preferred according to the invention. Mica-containing fillers can preferably additionally be used, a two-component filler comprising muscovite mica and quartz having a low heavy metals content being most particularly preferred here.

For the purposes of weight reduction the mixture of substances can contain lightweight fillers in addition to the aforementioned "normal" fillers. Lightweight fillers have the characterizing feature according to the invention that they have a lower density than the preparation into which they are incorporated, such that the addition thereof reduces the density of the preparation. Such lightweight fillers can be selected from the group of hollow metal beads such as for example hollow steel beads, hollow glass beads, fly ash (Finite), hollow plastic beads based on phenolic resins, epoxide resins or polyesters, expanded hollow microbeads with wall material made from (meth)acrylic acid ester copolymers, polystyrene, styrene (meth)acrylate copolymers and in particular polyvinylidene chloride as well as copolymers of vinylidene chloride with acrylonitrile and/or (meth)acrylic acid esters, hollow ceramic beads or organic lightweight fillers of natural origin such as ground nut shells, for example the shells of cashew nuts, coconuts or peanut shells as well as cork meal or coke powder. Lightweight fillers based on hollow microbeads, which in the cured molding matrix ensure a high compressive strength of the molding, are particularly preferred here. Furthermore, carbon nanotubes can be considered as suitable fillers.

The fillers (normal fillers and lightweight fillers together) having an average particle size of less than 150 nm are contained in the resulting application preparations preferably in amounts from 0 to 30 wt. %, in particular from 1 to 20 wt. %, relative in each case to the resulting application preparation.

If at least one of the components of the multi-component agent contains particulate drying agents, it has proved advantageous for said particulate drying agents to have an average particle size of less than 150 nm. In the case of the two-component agent used according to the invention it is advantageous for component A and/or component B to contain at least one drying agent having an average particle size of less than 150 nm. According to the invention "drying agents" are understood to be compounds which are capable of binding liquids, preferably water. Representatives of this substance class that are preferred according to the invention are calcium oxide and/or magnesium oxide and/or zeolites.

It can be particularly preferable according to the invention for the drying agent having an average particle size of less than 150 nm to be packaged in component A. This avoids a decomposition of the isocyanate groups due to $CO_2$ cleavage in the presence of water and the resulting adhesive bonds have few unintended gas inclusions.

The drying agent having an average particle size of less than 150 nm is preferably contained in the resulting application preparation in amounts from 0 to 5 wt. %, in particular from 1 to 3 wt. %, relative in each case to the resulting application preparation.

In a further embodiment it has proved advantageous for the agents according to the invention to contain at least one thixotropic agent having an average particle size of less than 150 nm, such as for example pyrogenic silica and/or pulp fibers. The addition of the thixotropic agent increases the stability of the formulations. Thus it has proved advantageous to align the viscosities of the components of the multi-component agent to one another through the selective addition of thixotropic agents. In the case of the two-component agent used according to the invention the thixotropic agent can be contained in component A and/or component B. It can be preferable for both component A and component B to contain a thixotropic agent.

The thixotropic agent having an average particle size of less than 150 nm is preferably contained in the resulting application preparation in amounts from 0 to 8 wt. %, in particular from 0.1 to 4 wt. %, relative in each case to the resulting application preparation.

Particularly if the resulting application preparation is formulated free from solid particles, it can be preferable according to the invention if solid particles are placed in the mold together with the fibers. In principle the fibers can be coated with the particles, but the particles can also be placed separately in the mold.

The particles placed in the mold can come from the aforementioned classes of substances. The use of nanoscale particles can be dispensed with in this embodiment, however, and conventional materials having a usual average particle size can be used, such as for example particles up to an average particle size of up to 200 µm, in particular up to 100 µm.

As an alternative to particulate drying agents, drying agents that are dissolved in the components can also preferably be used. These are preferably special silanes such as for example vinyl trimethoxysilane, which is available from Evonik under the trade name Dynasylan® VTMO, or 3(-glycidoxypropyl)trimethoxysilane, which is likewise sold by Evonik under the trade name Dynasylan® GLYMO.

The multi-component agents used according to the invention can furthermore contain further common auxiliary agents and additives, such as for example plasticizers, rheology aids, internal release agents, wetting agents, adhesion promoters, antioxidants, stabilizers and/or colored pigments. The proportions of the individual components can vary within comparatively broad limits, depending on the requirements profile in terms of processing properties, flexibility, the required stiffening effect and the adhesive bond to the substrates.

The second process step that is substantial to the invention for producing the fiber composite material according to the invention is the introduction of the resulting application preparation from step a) into a mold containing fibers and optionally further additives.

The term "mold" is used here in a broad sense. Thus the mold can be formed entirely from rigid materials, such as for example metals and/or reinforced plastics.

The mold can also be designed with at least one flexible side, however. Thus, for example, one half of the mold can be formed by a film layer which is joined at the edges to the lower mold with a gas-tight seal and which is pressed against the second half of the mold by vacuum during the introduction of the resulting application preparation. The partial vacuum that is formed causes the resulting application preparation to flow between the layers of the mold and saturate the fibers.

The introduction of the resulting application preparation can be brought about in principle in many different ways. The resulting application preparation is preferably introduced by applying a vacuum to the mold or by introducing the components under pressure. If the components are introduced under pressure, the mold must be manufactured entirely from materials that can withstand this pressure without deforming.

If the fibers placed in the mold are not sufficiently permeable for the resulting application preparation, it has proved advantageous to cover the fiber layer with a flow promoter. It is moreover advantageous to provide a permeable interlayer between the flow promoter and the fibers to enable the flow promoter to be removed from the fiber composite material without damaging it.

A further alternative that is preferred according to the invention for improving the flow characteristics of the resulting application preparation through the fibers is the introduction of channels into the fiber arrangement. This can be achieved for example through a corresponding arrangement of the loose fibers, selective sewing techniques or the introduction of random fiber sheets between the fibers.

Examples of such methods are infusion technology and injection technology.

The fibers are preferably included according to the invention in an amount such that their proportion by volume in the finished fiber composite material is 30 to 60 vol. %.

It has proved preferable according to the invention for the resulting application preparation to be liquid at the time of introduction into the mold.

According to the invention a preparation is described as "liquid" if at the time of introduction into the three-dimensional mold it has a viscosity of less than 20,000 mPas, preferably less than 10,000 mPas, at the application temperature and under normal pressure (measurement conditions: rotary rheometer with a plate/plate geometry (PP20), shear rate 100 s$^{-1}$, material coating thickness 0.2 mm). It has proved advantageous according to the invention if the preparation is liquid at a temperature below 85° C., preferably at a temperature below 50° C., in particular at a temperature below 30° C. It is further preferable if the liquid preparation is introduced into the mold at a temperature below 85° C., preferably at a temperature below 50° C., in particular at a temperature below 30° C.

In the next step that is substantial to the invention the resulting mixture is pre-cured at a temperature from 5° C. to 90° C. It can be preferable according to the invention if pre-curing takes place in the range from 20° C. to 75° C.

In one embodiment it can be preferable according to the invention simply to leave the resulting mixture at ambient temperature until the spontaneous reaction between the isocyanate groups and the hydroxyl, thiol or amino groups is completed.

However, in the context of another likewise preferred embodiment, it can also be preferable actively to apply heat. This can be achieved for example by introduction into an oven, by irradiation with IR radiation, by heat radiation with a fan heater, by electrical heating of the parts to be joined (electrical resistance), by heating wires integrated into the adhesive layer, by heating the mold by induction or by heating with a heating liquid, as is done for example in a heating press.

The pre-curing time is preferably from 1 second to 24 hours, in particular from 10 seconds to 1 hour. The fiber composite material can be removed from the mold, either immediately or optionally after appropriate cooling.

According to the invention, after pre-curing and optional cooling the fiber composite material has a consistency such that it can be removed from the mold without being damaged. This can be supported according to the invention through the choice of correspondingly coated molds and by placing release-supporting auxiliary agents in the mold, such as for example appropriate foils, papers or films. It is moreover preferable according to the invention if, after pre-curing, the fiber composite material has a consistency such that it can be stored without difficulty and then taken to its place of use. It is particularly preferable according to the invention for the fiber composite material, after pre-curing and optional cooling, to be dimensionally stable at 22° C.

According to the invention a fiber composite material is described as "dimensionally stable" if the geometry of said fiber composite material does not deform under the influence of gravity at the specified temperature within 1 hour. A deformation under pressure and/or under a rise in temperature is however possible, and can even facilitate the further processing of the fiber composite material.

It can therefore be preferable according to the invention for the pre-cured fiber composite material to be removed from the mold after pre-curing.

It has also proved advantageous if the pre-cured fiber composite material exhibits little or no adhesion below 45° C., so that it can be stacked, stored and transported without difficulty. It can be preferable according to the invention for the pre-cured fiber composite material to be stored for a discretionary period of time and optionally transported after step (c) of the production method.

The period of time between application steps (c) and (d) is preferably a few minutes to several months, for example 1 minute to 6 months.

In process step (d) of the production of the fiber composite materials according to the invention the pre-cured mixture is finally cured at temperatures from 100° C. to 240° C.

The final curing time is preferably from 1 second to 6 hours, in particular from 30 seconds to 30 minutes. The cured fiber composite material can be removed from the mold, either immediately or optionally after appropriate cooling.

As has already been mentioned, the final curing can take place inside the mold. It can however also be preferable for the pre-cured fiber composite material to undergo further processing first. For the purposes of further processing it can be made moldable for example, by heating to temperatures below 100° C., and its geometry adapted to its intended application.

If final curing takes place outside the mold, it can be advantageous according to the invention for final curing to be integrated into a manufacturing step for the component containing the finally cured fiber composite material, such as a powder coating process in automotive construction for example.

Final curing can take place for example by introducing the system into an oven, by irradiation with IR radiation, by induction heating, by electrical heating (using electrical resistance) or also by applying a heating clamp.

If the fiber composite material was not removed from the mold after pre-curing, it is removed from the mold at the latest after final curing or after cooling following completion of final curing.

The present invention secondly provides a pre-cured fiber composite material obtainable by wetting fibers with a mixture of the components of a multi-component agent produced immediately before the wetting process, wherein
component A of the multi-component agent contains at least one compound having two or more isocyanate groups,
component B of the multi-component agent contains at least one compound which has at least two reactive groups selected from hydroxyl groups, thiol groups, primary amino groups and secondary amino groups and is simultaneously free from epoxy groups,
at least one of the components of the multi-component agent contains at least one epoxide prepolymer, wherein
the pre-cured fiber composite material contains at least one latent hardener for epoxide prepolymers.

In a preferred embodiment of this subject matter of the invention the pre-cured fiber composite material is obtained in a mold in which the fibers and optionally further constituents are placed.

Alternatively, however, the pre-cured fiber composite material can be obtained by wetting fibers, in particular continuous fibers, with the resulting application preparation and subsequently stacking and pre-curing the wetted fibers in an open half-mold. Stacking of the soaked fibers can be performed manually, in an analogous manner to conventional laminating methods, or also by robot-assisted means. The pre-cured fiber composite material formed in the half-mold can be further processed in the manner of the prepreg molds known in the prior art and then finally cured subsequently.

Within the meaning of the present invention the term "wetting" is understood to be an operation in which at least two substances are brought into contact with each other. For example, the wetting of fibers with at least one preparation is understood to mean that the fibers are soaked with the preparation or that a film of the preparation is applied to the surface of the fibers.

It has further proved advantageous for the resulting mixture to be pre-cured at a temperature from 5° C. to 90° C. after wetting of the fibers. The pre-cured fiber composite material can be removed from the mold, optionally after cooling.

All that has been stated in respect of the other subject matters of the present invention applies with necessary alterations to the details of this subject matter.

The present invention thirdly provides a method for producing a fiber composite material, encompassing at least the following steps:

(a) mixing the components of a multi-component agent immediately before use, wherein
component A of the multi-component agent contains at least one compound having two or more isocyanate groups,
component B of the multi-component agent contains at least one compound which has at least two reactive groups selected from hydroxyl groups, thiol groups, primary amino groups and secondary amino groups and is simultaneously free from epoxy groups, and
at least one of the components of the multi-component agent contains at least one epoxide prepolymer,
(b) introducing the resulting application preparation into a mold in which fibers and optionally further additives are present, the resulting mixture containing at least one latent hardener for epoxide prepolymers,
(c) pre-curing the resulting mixture at a temperature from 5° C. to 90° C., and
(d) then finally curing the application preparation at temperatures from 100° C. to 240° C.,
wherein the fiber composite material being removed from the mold after step (c) or step (d).

It has proved advantageous according to the invention for the mold to be evacuated before and/or during introduction of the application preparation in step (b).

It can moreover be preferable according to the invention for the introduction of the resulting application preparation in step (b) to take place under application of a vacuum.

Alternatively it can be just as preferable according to the invention for the resulting application preparation to be introduced into the mold in step (b) under pressure.

According to the invention the introduction of the resulting application preparation takes place "under pressure" if the resulting application preparation is introduced into the mold under a pressure that is at least 1.1 times, in particular at least 2 times the prevailing air pressure.

All that has been stated in respect of the other subject matters of the present invention applies with necessary alterations to the details of this subject matter.

The present invention fourthly provides a method for producing a pre-cured fiber composite material, wherein fibers are wetted with a mixture of the components of a multi-component agent produced immediately before the wetting process, wherein
component A of the multi-component agent contains at least one compound having two or more isocyanate groups,
component B of the multi-component agent contains at least one compound which has at least two reactive groups selected from hydroxyl groups, thiol groups, primary amino groups and secondary amino groups and is simultaneously free from epoxy groups, and at least one of the components of the multi-component agent contains at least one epoxide prepolymer, wherein the pre-cured fiber composite material contains at least one latent hardener for epoxide prepolymers.

It has proved preferable if the fibers are placed in a mold, the mold is filled with the mixture of the components of the multi-component agent, and the system is then pre-cured for a period from 0.01 seconds to 24 hours at a temperature from 5° C. to 90° C.

All that has been stated in respect of the other subject matters of the present invention applies with necessary alterations to the details of this subject matter.

The present invention fifthly provides components containing a fiber composite material according to the invention. By reason of the broad spectrum of processing possibilities, the fiber composite materials according to the invention can be processed into a large number of components. By reason of their distinctive appearance, a use of the fiber composite materials according to the invention in the decorative sector is also preferred in some cases (for example in the case of carbon fiber-reinforced fiber composite materials). Such components can be rotor blades for wind turbines, exterior shell or body parts of vehicles, aircraft and watercraft parts, bicycle frames and bicycle parts, skis or protective sports gear, for example.

EMBODIMENT EXAMPLES

Unless otherwise specified, the quantities given in the examples are percentages by weight, relative to the component in question.

1 Production of Example Recipes I to IV:

TABLE 1

|  | Example I [wt. %] | Example II [wt. %] | Example III [wt. %] | Example IV [wt. %] |
| --- | --- | --- | --- | --- |
| Component A |  |  |  |  |
| Desmodur ® VL R10 | 74.5 | 50.0 | 50.0 | 20.0 |
| DER ® 332 | — | 50.0 | 50.0 | 80.0 |
| Super 40 | 5.0 | — | — | — |
| DER ® 331 | 20.5 | — | — | — |
| Component B |  |  |  |  |
| DER ® 331 | 67.1 | — | — | — |
| Dyhard ® UR700 | 0.6 | — | — | — |
| Dibutyl tin laurate | 0.1 | — | — | — |
| Dyhard ® 100SH | 8.0 | — | — | — |
| Super 40 | 4.0 | — | — | — |
| PV fast green GNX | 0.5 | — | — | — |
| Desmophen ® 1240BT | 16.4 | — | — | — |
| Desmophen ® 1145 | — | 75.0 | 88.0 | 66.0 |
| Durite ® SD-1713 | — | 25.0 | — | — |
| Baxxodur ® ECX-2450 | — | — | 12.0 | 34.0 |
| TMP | 3.3 | — | — | — |
| Characteristic values |  |  |  |  |
| Mixing ratio A:B [parts by weight] | 1:4 | 1:1.2 | 1:1 | 1.8:1 |
| PU content [wt. %] | 28.0 | 64.6 | 69.0 | 36.4 |

The aforementioned constituents of components A and B of examples I to IV were each mixed in a planetary mixer. This was generally operated at a temperature of 22° C.; only component B of example II was produced at a temperature of 75° C. After production, components A and B were introduced into sealed containers and stored.

Then components A and B of examples Ito IV were each mixed in a separate mixing vessel in the aforementioned mixing ratios; only component B of example II had to be heated to approximately 40° C. before mixing.

2. List of Raw Materials Used:

| Baxxodur ® ECX-2450 | 1-Ethyl-3-methyl-1H-imidazolium acetate (approx. 40-60 wt. % active substance content); manufacturer: BASF |
| --- | --- |
| DER ® 331 | Reaction product of bisphenol A with epichlorohydrin; EEW 187 g/eq; manufacturer: Dow |
| DER ® 332 | Reaction product of bisphenol A with epichlorohydrin; free from hydroxyl groups according to manufacturer's information, EEW 171-175 g/eq; manufacturer: Dow |
| Desmodur ® VL R10 | Diphenylmethane-4,4-diisocyanate with isomers and higher-functional homologs, manufacturer: Bayer |
| Desmophen ® 1145 | Polyester-polyether polyol (branched polyalcohol with ester and ether groups), OH equivalent weight 239 g/eq (manufacturer: Bayer) |
| Desmophen ® 1240BT | Trimethylolpropane-propylene oxide adduct (manufacturer: Bayer) |
| Durite ® SD-1713 | Phenolic resin; epoxide hardener with an equivalent weight of aromatic hydroxyl groups of approx. 100 g/eq; manufacturer: Hexion |
| Dyhard ® 100SH | 1-Cyanoguanidine; approx. 94.8% purity (manufacturer: Evonik Degussa) |
| Dyhard ® UR700 | Substituted urea; manufacturer: Evonik Degussa |
| PV fast green GNX | Pigment Green 7 (manufacturer: Clariant) |
| Super 40 | Calcium oxide; purity at least 93%; manufacturer: Ulmer Weißkalk GmbH |
| TMP | 1,1,1-Tris(hydroxymethyl)propane |

3 Determination of Mechanical Properties

Measurements of the physical and mechanical properties were performed without exception on the pure resin mixture according to example 1, without any form of fiber reinforcement.

The modulus of elasticity and the ultimate elongation of example recipe I were determined using "dog bone" specimens in accordance with DIN EN ISO 527-1/-2 with type 5A specimens. To produce the necessary substance specimens, components A and B of example I were mixed together and then introduced into a mold having a square base and a height of 2 mm, ensuring freedom from air bubbles and inclusions. Pre-curing then took place in this mold in a heating cabinet at 80° C. for 20 min.

After this pre-curing/storage, the individual materials were finally cured in the described mold for 30 min at 180° C. in a circulating-air oven. The 2 mm thick sheets of completely cured materials thus obtained were removed from the mold and the type 5A specimens required for measurement were cut out. After conditioning the specimens for at least 24 h at 22° C. the modulus of elasticity and the ultimate elongation were determined in accordance with DIN EN ISO 527-1/-2.

The values obtained for example recipe I are summarized in the table below:

TABLE 2

|  | Example 1 |
| --- | --- |
| Shore A hardness (after pre-curing) | 60 |
| Tensile strength after final curing [MPa] | 75 |
| Modulus of elasticity after final curing [MPa] | 4000 |
| Ultimate elongation after final curing [%] | 2.62 |

The measured values clearly show that the preparation according to the invention from example I can be pre-cured in a first curing reaction to form a dimensionally stable material, and that this pre-cured material can be processed in a further reaction to form the finally cured material. Moreover, the mechanical properties from example I show that after its final curing, the formulation has a very high strength and a very high modulus of elasticity and thus exhibits the basic properties of a matrix resin.

4 Production of a Fiber Composite Material 4.1 Incorporation into Fiber Material without a Specially Defined Mold:

One layer of glass-fiber unidirectional nonwoven fabric having a weight per unit area of 800 g/m², spread out over a flat sheet of non-adhesive plastic, was used as the fiber material in each case. Immediately before soaking of the fibers, components A and B of the example recipes were mixed together in the mixing ratios specified in Table 1 as described above and heated so that the resulting resin mixture was just flowable in each case. Then the heated resin mixture was poured onto the dry fiber material in such a way that it could flow into the fiber interstices within a few minutes. The soaking process was improved where necessary by working in with auxiliary aids such as press rollers. On completion of soaking of the fibers, pre-curing at 80° C. was completed within 20 min. After cooling, the materials were dimensionally stable but could be reshaped at elevated temperature above 100° C. Final curing took place at 180° C. within 30 minutes.

4.2 Incorporation into Fiber Material with a Defined Mold:

Four layers of glass-fiber unidirectional nonwoven fabric, each with a weight per unit area of 800 g/m², were used as the fiber material, placed in a steel mold with a gate and overflow pipe, which was closed on two sides and treated with a release agent. The mold cavity had the dimensions 100×100×2 mm. immediately before soaking of the fibers, components A and B of example recipe III were mixed together in the mixing ratio specified in Table 1 as described above and heated so that the viscosity of the resin was below 200 mPas. Using a peristaltic pump, the resin was pressed into the mold, which was closed at the overflow but had been pre-evacuated from there in advance, within a few minutes so that the fiber material was completely soaked. As soon as the mold was full, a follow-up pressure of 1 bar was applied and pre-curing was performed while maintaining the pressure, at 80° C. within 20 min. The resulting sheets had a fiber volume content of approx. 50 vol. %. After cooling, the material was dimensionally stable and was able to be removed from the mold without difficulty. However, reshaping at elevated temperature (over 100° C.) was not possible. Final curing took place at 180° C. within 30 minutes.

The invention claimed is:

1. A method for producing a fiber composite material, comprising the steps of:
(a) mixing a multi-component agent that comprises:
  (i) component A having at least one compound that contains at least two isocyanate groups,
  (ii) component B having at least one compound that contains at least two reactive groups selected from hydroxyl groups, thiol groups, primary amino groups and secondary amino groups; and wherein component B is free of an epoxy compound, and
  (iii) an epoxide prepolymer that is essentially free of OH and has an hydroxyl equivalent weight of at least 4000;
(b) introducing the mixed agent of step (a) into a mold, which comprises a plurality of fibers and a latent hardener; wherein the time period between the mixing of step (a) and the introducing of step (b) is less than 120 minutes;
(c) pre-curing the mixing agent of step (a) that has been introduced in the mold of step (b) at temperatures of from 5° C. to 90° C. for a period of time of 10 seconds to 1 hour to form a pre-cured fiber composite material that is dimensionally stable and exhibits little adhesion below 45° C.; and
(d) curing the pre-cured fiber composite material of step (c) at temperatures of from 100° C. to 240° C. for a period of time of 30 seconds to 30 minutes to form a cured fiber composite material; and
(e) optionally removing the so formed cured fiber composite material from the mold after step (c) or step (d).

2. The method according to claim 1, wherein vacuum is applied to the mold in step (b).

3. The method according to claim 1 wherein the mixed agent is introduced under pressure in step (b).

4. A method for producing a pre-cured fiber composite material, comprising the steps of:
(a) mixing a multi-component agent that comprises:
  (i) component A having at least one compound that contains at least two isocyanate groups,
  (ii) component B having at least one compound that contains at least two reactive groups selected from hydroxyl groups, thiol groups, primary amino groups and secondary amino groups; and wherein component B is free of an epoxy compound, and
  (iii) an epoxide prepolymer that is essentially free of OH and has an hydroxyl equivalent weight of at least 4000;
(b) wetting the multi-component agent with a plurality of fibers and a latent hardener; wherein the time period between mixing (a) and wetting (b) is less than 120 minutes.

5. The method according to claim 3, wherein the fibers are placed in a mold, the mold is then filled with the multi-component agent, and the wetted fibers are pre-cured for a period from 0.01 seconds to 24 hours at a temperature range of from 5° C. to 90° C.

* * * * *

UNITED STATES PATENT AND TRADEMARK OFFICE
CERTIFICATE OF CORRECTION

PATENT NO. : 10,066,134 B2  
APPLICATION NO. : 14/050940  
DATED : September 4, 2018  
INVENTOR(S) : Martin Renkel et al.

It is certified that error appears in the above-identified patent and that said Letters Patent is hereby corrected as shown below:

In the Specification

Column 4, Line 64, change "toluoylene" to -- toluylene --

Column 6, Line 35, change "at feast" to -- at least --

Column 7, Line 10, change "dials" to -- diols --

Column 7, Line 35, change "trials" to -- triols --

Column 7, Line 37, change "trials" to -- triols --

Column 9, Line 53, change "Flexion" to -- Hexion --

Column 15, Line 10, change "pentane-2,4-diose" to -- pentane-2,4-dione --

Column 16, Line 35, change "11e" to -- lie --

Column 19, Line 63, change "Finite" to -- Fillite --

Column 27, Line 30, change "immediately" to -- Immediately --

Signed and Sealed this  
Second Day of July, 2019

Andrei Iancu  
*Director of the United States Patent and Trademark Office*